United States Patent [19]

Kusago

[11] Patent Number: 5,662,950
[45] Date of Patent: Sep. 2, 1997

[54] ROLL BENDING DEVICE FOR FORMING PLASTIC SHEET

[75] Inventor: Toshihiko Kusago, Susono, Japan

[73] Assignee: Toshiba Machine Co., Ltd., Tokyo, Japan

[21] Appl. No.: 613,938

[22] Filed: Mar. 13, 1996

[30] Foreign Application Priority Data

Mar. 13, 1995 [JP] Japan ................... 7-080674

[51] Int. Cl.⁶ ................................. B29C 43/24
[52] U.S. Cl. ................ 425/367; 100/168; 100/170
[58] Field of Search ........................ 425/363, 367, 425/141; 100/168, 169, 170

[56] References Cited

U.S. PATENT DOCUMENTS

| 4,817,406 | 4/1989 | Alich | 100/170 |
|---|---|---|---|
| 5,048,411 | 9/1991 | Siebert | 100/170 |
| 5,495,798 | 3/1996 | Niskanen et al. | 100/170 |

FOREIGN PATENT DOCUMENTS

| 2-86715 | 7/1990 | Japan . |
|---|---|---|
| 5-178505 | 7/1993 | Japan . |
| 723 041 | 2/1955 | United Kingdom . |
| 747 347 | 4/1956 | United Kingdom . |
| 1 133 944 | 11/1968 | United Kingdom . |
| 1 458 949 | 12/1976 | United Kingdom . |

Primary Examiner—Khanh P. Nguyen
Attorney, Agent, or Firm—Cushman Darby & Cushman IP Group of Pillsbury Madison & Sutro, LLP

[57] ABSTRACT

The present invention aims to provide a roll bending device for forming plastic sheet wherein no bending cylinders are used and operability is improved. A roll has a shaft at its both end portions, a second roll has a shaft at its both end portions. A pair of first housings has a bearing for supporting the shaft, and is positioned at both end portions of the shaft. A pair of housings has a bearing for supporting the shaft, and is positioned at both end portions of the shaft. A pair of housings has a bearing for supporting the shaft, and is positioned at the inside of the housings. A pair of housings has a bearing for supporting the shaft, and is positioned at the inside side of the housings. A pair of main cylinders supports the housings to pressurize the roll in a direction of the roll. A pair of gap adjusting devices is provided between the housings and to adjust a gap therebetween.

2 Claims, 2 Drawing Sheets

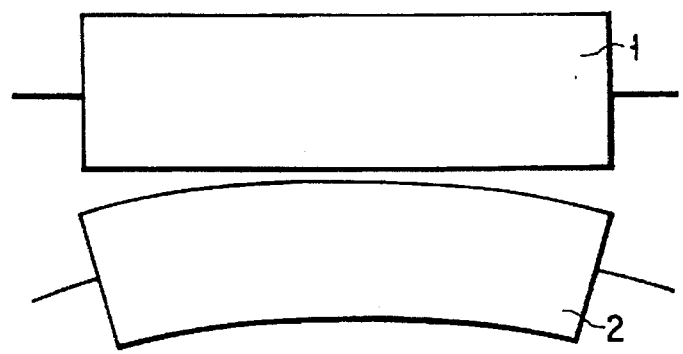
F I G. 3

ROLL BENDING DEVICE FOR FORMING PLASTIC SHEET

BACKGROUND OF THE INVENTION

1. Field of the Invention

The present invention relates to a roll bending device for forming plastic sheet or film (hereinafter called as "plastic sheet").

2. Description of the Related Art

FIGS. 2 to 4 explain a conventional roll bending device for forming plastic sheet.

FIGS. 2 and 3 is schematic views showing a deformation state of rolls in forming plastic sheet. As shown in FIG. 2, in a case where molten resin is guided to a pair of rolls to form plastic sheet, rolls 1 and 2 are subjected to counterforce based on flow stress, and curved. As a result, the formed plastic sheet has a substantially barrel-like cross section. Actually, in order to prevent the generation of such an improper cross section, one roll 2 is curved against the other roll 1 before the plastic sheet is formed. Thereby, the formed plastic sheet has a flat cross section.

FIG. 4 shows the structure of the conventional roll bending device. In this case, FIG. 4 illustrates only one side since this device is structured to be symmetrical in a width direction of the rolls.

A frame 6 for supporting the entire device including the rolls is provided at end portions of the rolls 1 and 2. A rotation shaft 25 is projected from the end portion of the upper side roll 1. The rotation shaft 25 is supported by a bearing 4. A housing 5 containing the bearing 4 is fixed to the frame 6. A rotation shaft 7 is projected from the end portion of the lower side roll 2, and the rotation shaft 7 is supported by two bearings 11 and 9, which are arranged to be adjacent to each other in an axial direction. A housing 12, which is positioned at an inner side and which contains the bearing 11, is fixed to the frame 6 through a main cylinder 13. On the other hand, a housing 10, which is positioned at an outer side and which contains the bearing 9, is fixed to the frame 6 through a cylinder 8 for bending. Also, a gap adjusting means 14, which is used to adjust a gap δ between the rolls 1 and 2, is provided between the housing 5 and the housing 11.

In order to adjust the gap δ between the rolls 1 and 2, a wedge 15, which is provided in the gap adjusting means 14, is displaced by use of a driving device (not shown) in an axial direction of the roll (direction of an arrow c). Together with the above operation, the roll 2 is pressurized to the direction of the roll 1 (direction of an arrow b) by the main cylinder 13.

In order that the roll 2 is curved against the roll 1 before forming the plastic sheet, a load is applied to the bearing 9 supporting the end portion of the rotation shaft 7 in a direction opposite to the main cylinder 13 (direction an arrow a) by use of the cylinder 8 for bending. Thereby, bending moment acts on the roll 2 based on the loads to be applied through the bearings 11 and 9 in opposite direction to each other.

As mentioned above, in the conventional roll bending device for forming the plastic sheet, the loads of the direction opposite to each other, that is, pressing force due to the main cylinder 13 and drawing force due to the cylinder 9 for bending are made to act on the rotation shaft 7, individually. Due to this, two kinds of cylinders, the main cylinder 13 and the cylinder 8 for bending are needed. Moreover, since the load of the main cylinder 13 must be changed in accordance with the change of the bending moment on the rotation shaft 7 applied by the load of the cylinder 8 for bending, there are disadvantages in which the control system of the device becomes complicated, and operability worsens.

SUMMARY OF THE INVENTION

An object of the present invention is to provide a roll bending device for forming plastic sheet, which eliminates the disadvantage of complication of a control system caused by individually controlling two kinds of cylinders or unfavorable operability, thereby simplifying an operation.

According to the present invention, there is provided a roll bending device for forming plastic sheet, comprising a first roll having a first shaft at its both end portions; a second roll, having a second shaft at its both end portions, and arranged in parallel with the first roll with a gap portion therebetween for pressing and forming plastic sheets; a pair of first housings, having a bearing for supporting the first shaft, and positioned at both end portions of the first shaft; a pair of second housings, having a bearing for supporting the second shaft, and positioned at both end portions of the second shaft; a pair of third housings, having a bearing for supporting the first shaft, positioned at the inside of the first housing, and fixed to a frame; a pair of fourth housings, having a bearing for supporting the second shaft, positioned at the inside of the second housing, and fixed to the frame; a pair of main cylinders for supporting the fourth housings having a base portion fixed to the frame, pressing the second roll in a direction of the first roll; and a pair of gap adjusting means, provided between the first housings and the second housings, for adjusting a gap therebetween.

According to the above-mentioned structure, the main cylinders has a function of pressurizing the second roll to the direction of the first roll and a function of curving the first and second. In other words, if the load is applied to the fourth housings by the main cylinders, counterforce caused by the load of the main cylinders is generated between the first and second housings and between the third housing and the frame. As a result, bending moment acts on the first and second rolls. Therefore, the rolls can be curved without using the cylinder for bending as employed in the conventional device.

Further, according to the above-mentioned structure, an amount of curvature to be provided to the rolls 1 and 2 before forming the plastic sheet are determined by only the load of the main cylinder 13. In other words, if the load of the main cylinder 13 is constantly maintained, the amount of curvature of the rolls is unchanged even if the roll gap δ is changed by the wedge mechanism. Therefore, according to the roll bending device of the present invention, the roll gap can be easily adjusted in a state that the amount of curvature of the rolls is constantly maintained.

Therefore, according to the roll bending device of the present invention, the cylinder for bending is not needed, and the method for adjusting the roll space and the amount of curvature is simplified. Then, the complicated control system using two kinds of cylinders, which is the problem in the conventional device, is not required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 3 is a schematic view showing a state when one roll is curved against the other roll.

DETAILED DESCRIPTION OF THE PREFERRED EMBODIMENTS

Figure 1:
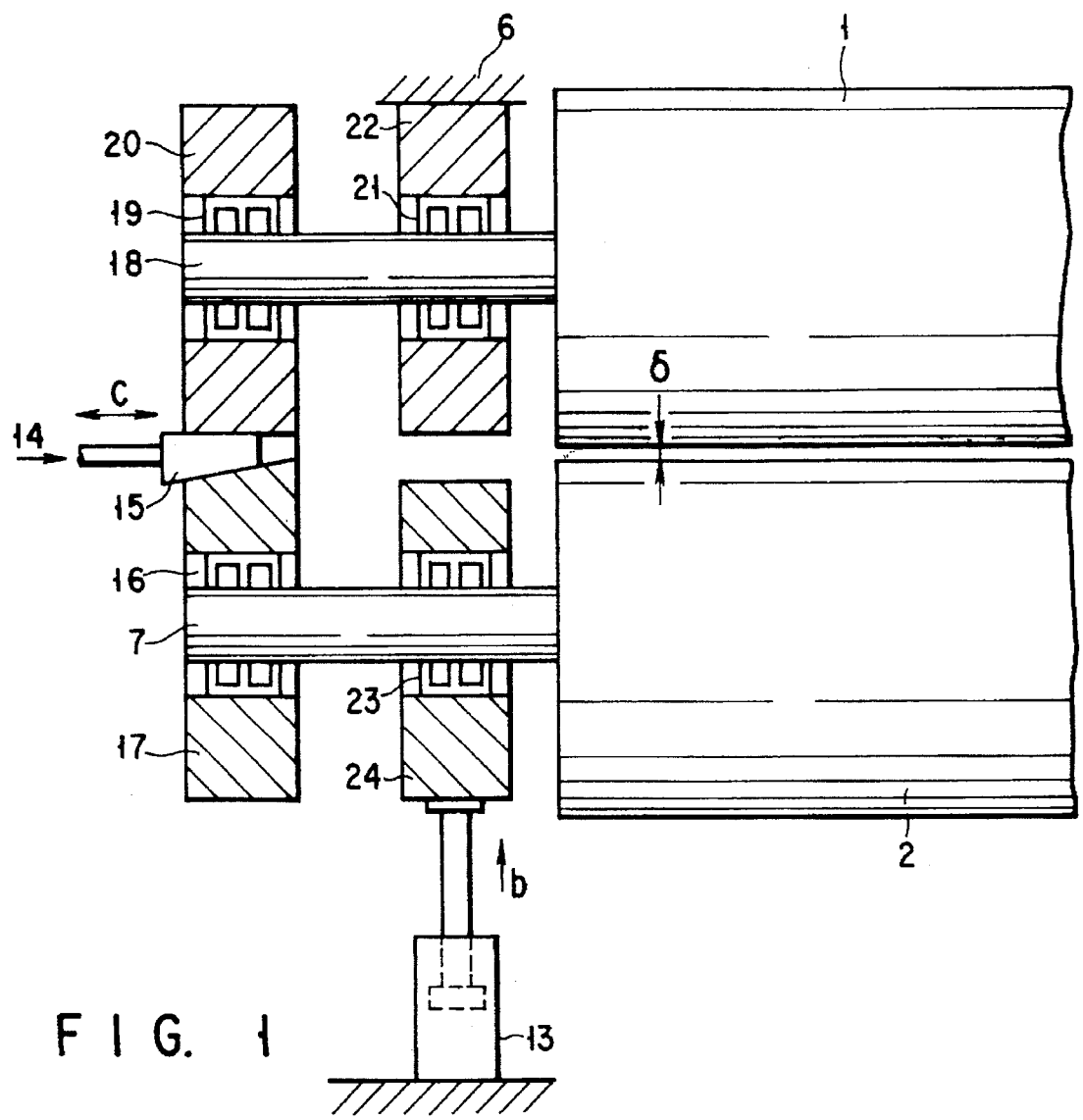
FIG. 1 is a view showing one example of the structure of a roll bending device for forming plastic sheet according to the present invention.
Figure 2:
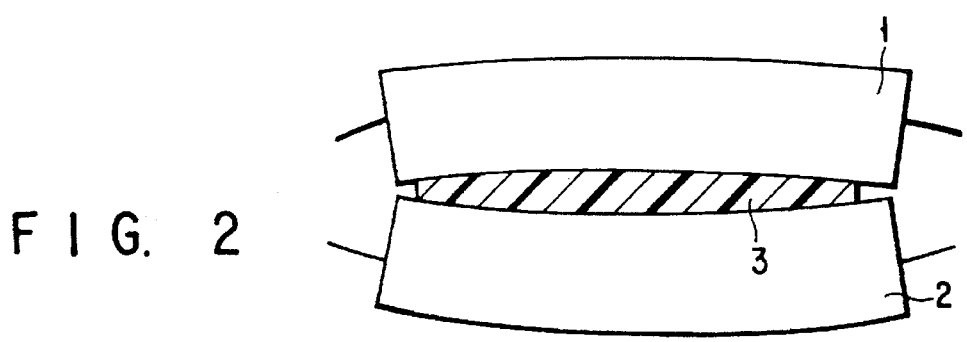
FIG. 2 is a schematic view showing a deformation state of rolls in forming molten resin by use of a pair of rolls.
Figure 4:
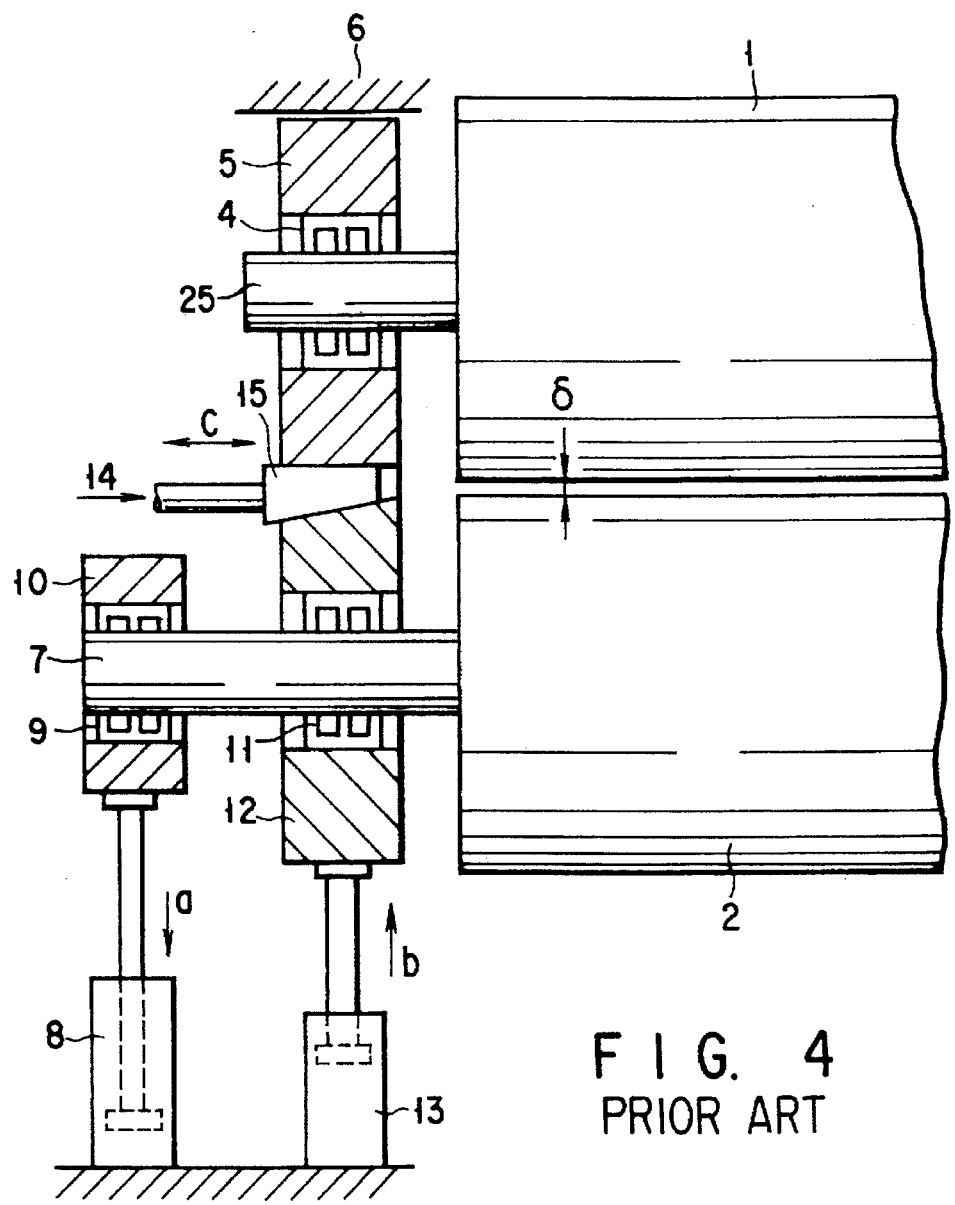
FIG. 4 is a view showing the structure of a conventional roll bending device for forming plastic sheet.

FIG. 1 is a view showing one example of the structure of a roll bending device for forming plastic sheet according to the present invention. FIG. 1 illustrates only one side since this device is structured to be symmetrical in a width direction of the rolls. This example is a roll bending device for forming plastic sheet, and using rolls are cooled polishing rolls solidifying molten resin.

A frame 6 for supporting rolls and the entire device is provided at the end portions of a roll 1 (first roll) and a roll 2 (second roll). A rotation shaft 18 (first rotation shaft) is projected from the end portion of the upper roll 1. The rotation shaft 18 is supported by two bearing 21 and 19, which are provided to be adjacent to each other in an axial direction. A housing 22 (third housing), which contains the bearing 21 positioned at an inner side, is fixed to the frame 6. A rotation shaft 7 (second rotation shaft) is projected from the end portion of the lower roll 2. The rotation shaft 7 is supported by two bearing 23 and 16, which are provided to be adjacent to each other in an axial direction. A housing 24 (fourth housing), which contains the bearing 23 positioned at the inner side, is fixed to the frame 6 through a main cylinder 13. A housing 20 (first housing), which contains the bearing 19 positioned at an outer side, and a housing 17, which contains the bearing 16 positioned at an outer side, are connected to each other through a gap adjusting means 14. The gap adjusting means 14 comprises a wedge mechanism 15 for adjusting a gap between the housing 20 and the housing 14.

First of all, in order to adjust an initial roll gap δ between the first 1 and the second roll 2, the wedge mechanism 15 of the gap adjusting means 14 is displaced in a direction of an arrow c. Together with this operation, the housing 24, which supports the rotation shaft 7 of the roll 2, is pressurized by the main cylinder 13 in a direction of an arrow b (direction where the roll gap δ is narrowed) with a predetermined load. Thereby, the space between the housing 17 and the housing 20 is adjusted, so that the initial roll gap δ is set.

Next, in order to provide curvature to the roll, the load applied to the housing 24 by the main cylinder 13 is increased. Due to the increase in the load, counterforce is transmitted to a portion of the other housing 17, which supports the rotation shaft 7, through the wedge mechanism 15. As a result, bending moment acts on the roll 2, so that the roll 2 is curved to be convex in an upper direction of the figure. Similarly, counterforce is transmitted to the rotation shaft 18 through the housing 20 and the housing 22, so that bending moment also acts on the roll 1, so that the roll 1 is curved to be convex in a lower direction of the figure.

According to the above-mentioned structure, an amount of curvature to be provided to the rolls 1 and 2 before forming the plastic sheet are determined by only the load of the main cylinder 13. In other words, if the load of the main cylinder 13 is constantly maintained, the amount of curvature of the rolls is unchanged even if the roll gap δ is changed by the wedge mechanism 15. Therefore, according to the roll bending device of the present invention, the roll gap δ can be easily adjusted in a state that the amount of curvature of the rolls is constantly maintained.

Therefore, according to the roll bending device of the present invention, the cylinder for bending is not needed, and the method for adjusting the roll gap and the amount of curvature is simplified. Then, the complicated control system using two kinds of cylinders, which is the problem in the conventional device, is not required.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A roll bending device for forming plastic sheet, comprising:

a first roll having a first shaft at its both end portions;

a second roll, having a second shaft at its both end portions, and arranged in parallel with said first roll with a gap portion therebetween for pressing and forming plastic sheets;

a pair of first housings, having a bearing for supporting said first shaft, and positioned at both end portions of said first shaft;

a pair of second housings, having a bearing for supporting said second shaft, and positioned at both end portions of said second shaft;

a pair of third housings, having a bearing for supporting said first shaft, positioned at the inside of the first housing, and fixed to a frame;

a pair of fourth housings, having a bearing for supporting said second shaft, positioned at the inside of the second housing, and fixed to said frame;

a pair of main cylinders for supporting said fourth housings having a base portion fixed to said frame, pressing said second roll in a direction of said first roll; and a pair of gap adjusting means, provided between said first housings and said second housings, for adjusting a gap therebetween.

2. The device according to claim 1, wherein said first and second rolls are cooled polishing rolls for solidifying molten resin.

* * * * *